(12) United States Patent
Nguyen et al.

(10) Patent No.: US 6,858,258 B2
(45) Date of Patent: Feb. 22, 2005

(54) METHOD OF COATING COILS USING A HIGH SOLIDS FLUOROCARBON COATING COMPOSITION

(75) Inventors: Diep Nguyen, Wexford, PA (US); Andrew J. Lauer, Lower Burrell, PA (US); Robert A. Montague, Allison Park, PA (US); Edward R. Millero, Jr., Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/731,817

(22) Filed: Dec. 9, 2003

(65) Prior Publication Data

US 2004/0122177 A1 Jun. 24, 2004

Related U.S. Application Data

(62) Division of application No. 09/923,655, filed on Aug. 7, 2001, now Pat. No. 6,699,933.

(51) Int. Cl.$^7$ ............... B05D 1/02; B32B 27/00; C08L 27/12; C08L 33/00; C08L 35/00
(52) U.S. Cl. ............... 427/425; 428/421; 525/199; 525/200; 525/217
(58) Field of Search ............... 427/425; 428/421; 525/199, 200, 217

(56) References Cited

U.S. PATENT DOCUMENTS

| | | | |
|---|---|---|---|
| 3,449,446 A | 6/1969 | Higgins | |
| 3,470,014 A | 9/1969 | Koblitz et al. | |
| 3,524,906 A | 8/1970 | Schmitt et al. | |
| 3,944,689 A | 3/1976 | Luckock et al. | 427/385.5 |
| 4,314,004 A | 2/1982 | Stoneberg | 428/421 |
| 4,659,768 A | 4/1987 | Tortorello et al. | 524/512 |
| 4,786,546 A | 11/1988 | Vassiliou | 428/215 |
| 6,017,639 A | 1/2000 | Higginbotham et al. | 428/458 |
| 6,255,398 B1 | 7/2001 | Zupancic et al. | 525/199 |

FOREIGN PATENT DOCUMENTS

| | | |
|---|---|---|
| CA | 756165 | 4/1967 |
| EP | 0 960 918 | 12/1999 |
| JP | 63-051479 A | 3/1988 |
| JP | 7-070508 A | 3/1995 |
| WO | 98/17723 | 4/1998 |

OTHER PUBLICATIONS

Lin et al., "Fluoropolymer Alloys—Performance Optimization of PVDF Alloys" *Fluoropolymers 2: Properties*, pp. 121–136, (1999).

*Primary Examiner*—Nathan M. Nutter
(74) *Attorney, Agent, or Firm*—William J. Uhl

(57) ABSTRACT

A coating composition which includes an aminoalkyl (meth) acrylate containing acrylic polymer, a fluorocarbon polymer and a solvent. The acrylic polymer includes at least one (meth)acrylate monomers and an aminoalkyl (meth)acrylate monomer described by the structure:

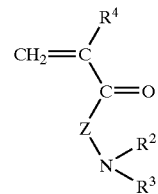

where Z is a divalent linking group; R2 and R3 are independently selected from H or C1–C6 linear or branched aliphatic; and R4 is H or CH3. The fluoropolymer coating composition may be applied using coil coating, spray coating or extrusion coating methods to an appropriate substrate.

48 Claims, No Drawings

METHOD OF COATING COILS USING A HIGH SOLIDS FLUOROCARBON COATING COMPOSITION

This is a division of application Ser. No. 09/923,655, filed Aug. 7, 2001, and now U.S. Pat. No. 6,699,933.

BACKGROUND OF THE INVENTION

1. Field of the Invention

The present invention relates to coating compositions based on non-aqueous dispersions of solid fluoropolymer particles in an organic solution of acrylic polymers.

The coatings, referred to as "organosols," may be clear or pigmented (opaque) coatings, which may be applied to a variety of substrates. In particular, the present invention is directed to coating compositions that have a high solids content and relatively few ingredients. The coating compositions are easily manufactured and may be applied using a number of art recognized techniques.

2. Description of the Prior Art

Fluoropolymer dispersion coatings are known in the art and are disclosed in, for example, Canadian Patent No. 756,165 to Koblitz et al., U.S. Pat. No. 4,314,004 to Stoneberg, and European Patent No. EP 0 960 918 to Lin et al.

Fluoropolymer dispersion coatings are known to exhibit outdoor durability, chemical resistance, and acceptable mechanical properties. The performance features of fluoropolymer dispersion coatings have led to their extensive use, for example, in the exterior building panel market. Fluoropolymer dispersion coatings are typically applied by spray and roll coating or coil coating of flat sheet stock techniques. The coating film is formed by thermal fusion of the fluoropolymer particles in admixture with an acrylic resin.

Historically, fluoropolymer dispersion coatings exhibit a relatively high viscosity at relatively low volume solids content. Consequently, as much as 65percent organic solvent by volume may be required to reduce the viscosity in order to facilitate application of the fluoropolymer dispersion coatings to a substrate.

The high level of volatile organic compounds (VOCs) of fluoropolymer dispersion coatings generally requires that the solvent vapors emitted by the wet film be captured and conveyed to a gas-fired incinerator or thermal oxidizer to destroy the VOCs. For example, the large amount of VOCs produced by coil coating flat metal sheet stock can limit the line speed of the coating application, or result in blistering of the film at higher film thicknesses. The incineration of the VOCs can also produce higher amounts of nitrogen oxide pollutants, particularly for fossil fuel-fired combustion processes.

U.S. Pat. No. 6,017,639 to Higginbotham et al. discloses a high solids thermoset fluorocarbon coating. However, the composition disclosed by Higginbotham et al. relies on expensive fluorinated surfactants or "hyperdispersants" as an essential element of the coating. The coating composition is relatively complex and includes a relatively long list of ingredients.

International Application No. WO 01/00739 to Zupancic et al. discloses a high solids thermoset fluorocarbon coating, which includes a "cross-linkable" acrylic resin. An additional required ingredient in the coating composition of Zupancic et al. is a cross-linking agent for the acrylic resin. The resulting film, although flexible and solvent resistant, provides only a modest degree of film hardness, as exemplified by the reported pencil rating of "F."

There is a clear and well defined need for a higher solids, lower VOC content liquid fluoropolymer coating composition, which would allow for higher line speed application, reduced blistering tendency of the applied coating, and a reduced impact on the environment from VOCs. Furthermore, it would be considered by those skilled in the art to be an advance and particularly economically advantageous development if such a coating composition could be achieved by the blending of relatively few ingredients while providing a simple formulation that would be easily manufactured and readily reproducible.

SUMMARY OF THE INVENTION

The present invention is directed to a simple, high solids fluoropolymer coating composition having excellent solvent resistance, hardness, and flexibility properties. The present high solids fluoropolymer coating composition does not require or include costly hyperdispersants or additional cross-linking agents.

More particularly, the fluoropolymer coating composition of the present invention includes an aminoalkyl (meth) acrylate containing acrylic polymer, a fluorocarbon polymer, and a solvent.

The acrylic polymer includes one or more (meth)acrylate monomers and one or more aminoalkyl (meth)acrylate monomers described by the structure:

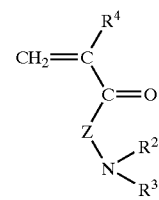

where Z is a divalent linking group; $R^2$ and $R^3$ are independently selected from H or $C_1$–$C_6$ linear or branched aliphatic; and $R^4$ is H or $CH_3$.

The present invention is also directed to methods of coating a substrate using the present fluoropolymer coating composition. The methods include coil coating, spray coating, and extrusion coating the present fluoropolymer coating composition to a substrate.

The present invention is further directed to substrates coated with the present fluoropolymer coating composition using any of the above-mentioned methods.

DETAILED DESCRIPTION OF THE PREFERRED EMBODIMENT

Other than in the operating examples, or where otherwise indicated, all numbers or expressions referring to quantities of ingredients, reaction conditions, etc. used in the specification and claims are to be understood as modified in all instances by the term "about."

The terms (meth)acrylic and (meth)acrylate are meant to include both acrylic and methacrylic acid derivatives, such as the corresponding alkyl esters often referred to as acrylates and (meth)acrylates, which the term (meth)acrylate is meant to encompass.

The fluoropolymer coating composition of the present invention includes a fluorocarbon polymer, an aminoalkyl (meth)acrylate containing acrylic polymer, and a solvent. The aminoalkyl(meth)acrylate containing acrylic polymer may be a thermoplastic resin. In an embodiment of the present invention, the fluorocarbon polymer is present as a dispersed phase and a solution including the acrylic polymer in the solvent is present as a continuous phase.

The acrylic polymer includes one or more (meth)acrylate monomers and one or more aminoalkyl (meth)acrylate monomers described by the structure I:

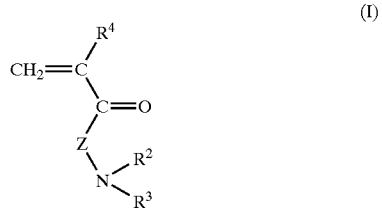

where Z is a divalent linking group; $R^2$ and $R^3$ are independently selected from H or $C_1$–$C_6$ linear or branched aliphatic; and $R^4$ is H or $CH_3$.

The divalent linking group Z may be described as an ester having the structure —O—$R^1$— or an amide having the structure —N($R^5$)—$R^1$—, where $R^5$ is H or $C_1$–$C_6$ linear or branched aliphatic, and $R^1$ may be $C_1$–$C_{20}$ linear or branched aliphatic, aryl, alkylaryl, ethoxylated alkyl, ethoxylated aryl, ethoxylated alkylaryl, propoxylated alkyl, propoxylated aryl, and propoxylated alkylaryl.

In an embodiment of the present invention, the aminoalkyl(meth)acrylate monomer may be an N-t-butyl, aminoalkyl(meth)acrylate. A non-limiting example of a suitable aminoalkyl(meth)acrylate monomer is t-butylaminoethyl methacrylate.

Any suitable (meth)acrylate monomer may be used when preparing the aminoalkyl(meth)acrylate containing acrylic polymer of the present invention. Examples of suitable (meth)acrylates include, but are not limited to, methyl(meth) acrylate, n-butyl(meth)acrylate, t-butyl(meth)acrylate, and ethyl(meth)acrylate.

In an embodiment of the present invention, the acrylic polymer contains 90 to 99.99 percent by weight, preferably 92 to 99.9 percent by weight, more preferably 95 to 99.9 percent by weight, and most preferably 98 to 99.9 percent by weight (meth)acrylic monomers based on the total weight of acrylic polymer. The acrylic polymer contains 0.01 to 10 percent by weight, preferably 0.1 to 8 percent by weight, more preferably 0.1 to 5 percent by weight, and most preferably 0.1 to 2 percent by weight aminoalkyl(meth) acrylate monomers based on the total weight of acrylic polymer. The inclusion of the aminoalkyl(meth)acrylate monomer provides for improved fluorocarbon dispersions. The dispersions contain minimal large particles and have good Hegman grind values, typically not exceeding 5 or 6. When the level of the aminoalkyl (meth)acrylate monomers is too high, the coating may develop a yellow colored tint.

The aminoalkyl(meth)acrylate containing acrylic polymer of the present invention may also contain one or more additional monomers having the structure II:

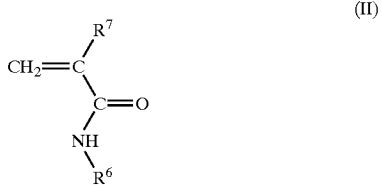

where $R^7$ is H or $CH_3$ and $R^6$ is —$CH_2$—OH or —$CH_2$—O—$R^{10}$, where $R^{10}$ is $C_1$–$C_6$ linear or branched aliphatic.

Examples of the additional monomers include, but are not limited to, N-butoxymethylol acrylamide, N-butoxymethylol methacrylamide, N-methylol acrylamide and N-methylol methacrylamide. The additional monomer provides the opportunity for the aminoalkyl (meth)acrylate containing acrylic polymer to be self-condensing. Therefore, in this embodiment, a separate crosslinking agent is not required in the present fluoropolymer coating composition.

In an embodiment of the present invention, the acrylic polymer may contain at least 70 percent by weight, preferably at least 73 percent by weight, more preferably at least 75 percent by weight, and most preferably at least 78 percent by weight and no more than 99.99 percent by weight, preferably no more than 99.9 percent by weight, more preferably no more than 99 percent by weight, and most preferably no more than 98 percent by weight (meth)acrylic monomers based on the total weight of acrylic polymer. The acrylic polymer may contain at least 0.01 percent by weight, preferably 0.1 percent by weight, more preferably 0.2 percent by weight, and most preferably at least 0.5 percent by weight and no more than 10 percent by weight, preferably no more than 8 percent by weight, more preferably no more than 5 percent by weight, and most preferably no more than 2 percent by weight aminoalkyl(meth)acrylate monomers based on the total weight of acrylic polymer. The acrylic polymer may optionally contain the additional monomers described above. When the acrylic polymer contains such additional monomers, they will be present at a level of at least 1 percent by weight, preferably at least 2 percent by weight, more preferably at least 3 percent by weight, and most preferably at least 5 percent by weight and no more than 20 percent by weight, preferably no more than 18 percent by weight, more preferably no more than 15 percent by weight, and most preferably no more than 13 percent by weight aminoalkyl(meth)acrylate monomers based on the total weight of acrylic polymer. Any combination of the above-cited ranges may be used for each monomer in the present acrylic polymer.

When the additional monomers are utilized, they provide a self-condensing property to the acrylic polymer. As such, when the level of additional monomers is too low, the final coating will have low solvent resistance. When the level of additional monomers is too high, the final coating may be brittle and/or prone to cracking. These coating defects are detrimental in that they may lead to poor coating aesthetics and/or corrosion of the substrate.

The weight-average molecular weight of the aminoalkyl (meth)acrylate containing acrylic polymer of the present invention will typically be less than 25,000 and be at least 250, as determined by gel permeation chromatography using polystyrene standards. The weight-average molecular weight of the aminoalkyl(meth)acrylate containing acrylic polymer of the present invention may be from 2,000 to 22,000, preferably from 5,000 to 20,000, more preferably from 7,000 to 20,000, and most preferably from 10,000 to 20,000 as determined by gel permeation chromatography using polystyrene standards.

The aminoalkyl(meth)acrylate containing acrylic polymer will typically constitute from 1 to 70 percent by weight, preferably from 10 to 60 percent by weight, more preferably from 20 to 55 percent by weight, and most preferably from 30 to 50 percent by weight of the resin solids portion of the fluoropolymer coating composition of the present invention.

The fluoropolymer coating composition of the present invention will typically include a solvent. Any suitable solvent may be used, so long as it is able to form a solution with the aminoalkyl(meth)acrylate containing acrylic polymer. The solution should be capable of providing a suitable continuous phase for the present high solids fluoropolymer coating composition. Suitable solvents include, but are not limited to, aliphatic hydrocarbons, aromatic hydrocarbons, ketones, esters, glycols, ethers, ether-esters, glycol ethers, glycol ether-esters, alcohols, ether-alcohols, phthalate plasticizers, and suitable mixtures thereof. Phthalate plasticizers include phthalates esters such as diethylhexyl phthalate, di-isononyl phthalate, diisodecyl phthalate, and dioctyl phthalate.

The fluorocarbon polymer in the present fluoropolymer coating composition may be any suitable fluorocarbon polymer for such coating compositions. Examples of suitable fluorocarbon polymers include, but are not limited to, poly (vinylidene fluoride), poly(vinyl fluoride), poly (chlorotrifluoroethylene), poly(tetrafluoroethylene), and poly(trifluoroethylene). The fluorocarbon polymer will typically have a weight average molecular weight of from 100,000 to 500,000 as determined by gel permeation chromatography using polystyrene standards.

In an embodiment of the present invention, the fluorocarbon polymer is in the form of solid dispersible particles. The particle size of the dispersible fluorocarbon polymer particles may be from 0.1 to 5.0 microns, preferably from 0.2 to 4.0 microns, and more preferably from 0.5 to 3.5 microns. When the particle size of the dispersible fluorocarbon polymer particles is too small, the viscosity of the fluoropolymer coating composition may become too high, resulting in a difficult to apply coating. When the particle size of the dispersible fluorocarbon polymer particles is too large, the particles may settle, resulting in a fluoropolymer coating composition with poor storage stability and/or a short shelf life.

Suitable fluorocarbon polymers are available commercially, for example, those fluorocarbon polymers sold under the trade name KYNAR® by Atofina Chemicals, Inc., Philadelphia, Pa. and those fluorocarbon polymers sold under the trade name Hylar® PVDF by Ausimont, an affiliate of the Montedison group, Milan, Italy.

The fluoropolymer coating composition may include the fluorocarbon polymer at from 30 to 99 percent, preferably from 40 to 90 percent by weight, more preferably from 45 to 85 percent by weight, and most preferably from 50 to 70 percent by weight based on the weight of the resin solids portion of the coating composition.

In an embodiment of the present invention, the fluoropolymer coating composition will include from 50 to 75 percent by weight, preferably from 55 to 70 percent by weight, and most preferably from 60 to 65 percent by weight resin solids based on the total weight of the fluoropolymer coating composition. The resin solids include, but are not limited to, the aminoalkyl(meth)acrylate containing acrylic polymer and the fluorocarbon polymer. The solvent will be present at from 25 to 50 percent by weight, preferably from 30 to 45 percent by weight, and most preferably from 35 to 40 percent by weight based on the total weight of the fluoropolymer coating composition.

The present high solids fluoropolymer coating compositions may be an unpigmented or clear coating, or they may be pigmented with a variety of materials to provide opaque coating films. When pigments are utilized in the high solids fluoropolymer coating compositions, they are typically incorporated as a second dispersed phase. Suitable pigments that may be used in the present high solids fluoropolymer coating composition include, but are not limited to, the inorganic metal oxides, organic compounds, metal flake and mica pigments for "metallic" effect colors, extender or filler pigments, and corrosion-inhibitive pigment types, such as chromates, silicas, silicates, phosphates, and molybdates. Organic compounds include, but are not limited to, diarylide m-xylidide, toluidine red, monoazo naphthol, quinacridone, pthalocyanine blue, indanthrone blue, phthalocyanine green, dinitraniline orange and dioxazine carbazole. Extender or filler pigments include kaolin, talc, calcium carbonate, diatomaceous earth, synthetic calcium silicates, perlite, cellulose fibers, ground silica, calcined clays, microspheres, fumed silica, treated fumed silicas, titanium dioxide, wet ground micas, synthetic fibers, snobrite clay, bentonite clay, micronized micas, attapulgite clays, and alumina trihydrate.

Other types of art recognized additives may be employed to control rheology, pigment dispersion, and settling, as well as flow or leveling. Occasionally, it may be advantageous to include UV absorbers and stabilizers for some pigmentations. Particularly useful UV stabilizers include those sold under the trade name TINUVIN by Ciba Specialty Chemicals, Basel, Switzerland.

The present invention is also directed to a method of coil coating a metal substrate and the coil coated substrate. In the present coil coating method, a coil coating apparatus is used to apply the high solids fluoropolymer coating composition of the present invention. The high solids fluoropolymer coating composition is applied such that the wet film thickness is 1 to 10 mils. The coating is then cured at a temperature of from 200° C. to 300° C. for 10 to 50 seconds to form a cured dry film with a film thickness of 0.5 to 6 mils.

The present invention is further directed to a method of spray coating a substrate and the spray coated substrate. In the present spray coating method, a spray coating apparatus is used to apply the high solids fluoropolymer coating composition of the present invention. The high solids fluoropolymer coating composition is applied such that the wet film thickness is 1 to 4 mils. The coating is cured at a temperature of 200° C. to 300° C. for 5 to 20 minutes to form a cured dry film with a film thickness of 0.3 to 2 mils.

Another embodiment of the present invention is directed to a method of extrusion coating a substrate and the extrusion coated substrate. In the present extrusion coating method, an extrusion coating apparatus is used to apply the high solids fluoropolymer coating composition of the present invention. The high solids fluoropolymer coating composition is applied such that the wet film thickness is 1 to 6 mils. The coating is cured at a temperature of 200° C. to 500° C. for 10 seconds to 20 minutes to form a cured dry film with a film thickness of 0.3 to 4 mils.

The high solids fluoropolymer coating composition may be applied using art recognized methods of brush coating and/or dip coating.

The high solids fluoropolymer coating composition of the present invention is particularly useful for coating metal substrates or plastic substrates. Particular end uses where coated substrates of the present invention may be found include, but are not limited to, building panels, roofing panels, automotive body parts and aluminum extrusions.

The present invention is more particularly described in the following examples, which are intended to be illustrative only, since numerous modifications and variations therein will be apparent to those skilled in the art. Unless otherwise specified, all parts and percentages are by weight.

EXAMPLE 1

This example demonstrates the preparation of an aminoalkyl(meth)acrylate containing acrylic polymer of the present invention. The polymer was prepared using the charges in Table 1.

TABLE 1

| CHARGE | MATERIAL NAME | WEIGHT |
|---|---|---|
| 1 | Toluene | 1564.1 |
| 2 | Toluene | 146.87 |
|   | t-Amyl Peroctoate | 59.23 |
|   | Lupersol 575, Atofina Chemicals, Inc., Philadelphia, Pa. | |
| 3 | Methyl Methacrylate | 1240.4 |
|   | N-butoxy methacrylamide | 251.6 |
|   | t-butylaminoethyl methacrylate | 13.9 |
| 4 | Toluene | 23.13 |
|   | t-Amyl Peroctoate | 4.18 |
| 5 | Toluene | 23.13 |
|   | t-Amyl Peroctoate | 4.18 |
| 6 | Toluene | 343.5 |
|   | bis-(1-octyloxy-2,2,6,6-tetramethyl-4-piperidinyl) sebacate | 13.9 |
|   | Tinuvin 123, Ciba Specialty Chemicals, Basel, Switzerland | |
|   | TOTAL WEIGHT | 3688.1 |

Charge 1 was added to a laboratory reactor fitted with a condenser, thermometer, and stirring mechanism and heated to 110° C., at which temperature a mild reflux was maintained. Charges 2 and 3 were fed to the reactor over a two-hour period while maintaining a mild reflux condition. The solution was maintained at reflux for an additional one-hour after the feed was completed. Charge 4 was fed to the reactor over a 5-minute period and the solution was maintained at reflux for an additional one hour. Charge 5 was fed to the reactor over a 5-minute period, and the solution was maintained at reflux for an additional one hour. Charge 6 was then added to the reactor, and the solution was cooled to ambient temperature.

The resulting solution had a total solids content of 41.7 percent. The solution had a Brookfield viscosity of 133.6 cps (spindle no. 2, 100 rpm, 21.9° C.). The resulting polymer had a number average molecular weight (Mn) of 3,702, a weight average molecular weight of 10,078 (Mw) and a polydispersity index (Mw/Mn) of 2.7 as measured by gel permeation chromatography using polystyrene standards.

EXAMPLE 2

This example demonstrates the preparation of an aminoalkyl(meth)acrylate containing acrylic polymer of the present invention. The polymer was prepared using the charges in Table 2.

TABLE 2

| CHARGE | MATERIAL NAME | WEIGHT |
|---|---|---|
| 1 | Toluene | 1000.9 |
| 2 | Toluene | 146.87 |
|   | t-Amyl Peroctoate | 52.26 |
|   | Lupersol 575, Atofina Chemicals, Inc., Philadelphia, Pa. | |
| 3 | Methyl Methacrylate | 975.6 |
|   | Ethyl Acrylate | 404.2 |
|   | t-butylaminoethyl methacrylate | 13.9 |
| 4 | Toluene | 23.13 |
|   | t-Amyl Peroctoate | 4.18 |
| 5 | Toluene | 23.13 |
|   | t-Amyl Peroctoate | 4.18 |

TABLE 2-continued

| CHARGE | MATERIAL NAME | WEIGHT |
|---|---|---|
| 6 | Toluene | 343.5 |
|   | bis-(1-octyloxy-2,2,6,6-tetramethyl-4-piperidinyl) sebacate | 13.9 |
|   | Tinuvin 123, Ciba Specialty Chemicals, Basel, Switzerland | |
|   | TOTAL WEIGHT | 3688.1 |

Charge 1 was added to a laboratory reactor fitted with a condenser, thermometer, and stirring mechanism and heated to 110° C., at which temperature a mild reflux was maintained. Charge 2 was added over a five-minute period. Five minutes after charge 2 was added, charge 3 was fed to the reactor over a two-hour period while maintaining a mild reflux condition. The solution was maintained at reflux for an additional one hour after the feed was completed. Charge 4 was fed to the reactor over a 5-minute period and the solution was maintained at reflux for an additional one hour. Charge 5 was fed to the reactor over a 5-minute period and the solution was maintained at reflux for an additional one hour. Charge 6 was then added to the reactor, and the solution was cooled to ambient temperature.

The resulting solution had a total solids content of 41.8 percent. The solution had a Brookfield viscosity of 71.8 cps (spindle no. 1, 50 rpm, 23.6° C.). The resulting polymer had a number average molecular weight (Mn) of 4,570, a weight average molecular weight of 12,032 (Mw), and a polydispersity index (Mw/Mn) of 2.6 as measured by gel permeation chromatography using polystyrene standards.

EXAMPLES 3–5

This example compares fluoropolymer coating compositions prepared using the aminoalkyl(meth)acrylate containing acrylic polymers of Examples 1 and 2 with a commercially available acrylic polymer that does not contain an aminoalkyl(meth)acrylate monomer. The coating compositions were prepared using the ingredients in Table 3.

TABLE 3

| Ingredient | Supplier | Example 3 | Example 4 | Example 5 |
|---|---|---|---|---|
| Charge 1 | | | | |
| Acrylic Polymer | Example 1 | 13.37 | | |
| Acrylic Polymer | Example 2 | | 12.91 | |
| Paraloid B44S Acrylic Resin | Rohm & Haas | | | 10.99 |
| BUTYL CELLOSOLVE | Union Carbide | 4.12 | 4 | 3.25 |
| Dimethyl Phthalate | Eastman | 2.58 | 2.49 | 2.03 |
| Titanium Dioxide R-960 | DuPont | 13.6 | 13.17 | 10.73 |
| Shepherd Black #1 | Shepherd | 2.72 | 2.63 | 2.15 |
| Shepherd Yellow #29 | Shepherd | 0.45 | 0.44 | 0.36 |
| RED IRON OXIDE R1599 | Elementis | 0.07 | 0.07 | 0.05 |
| Charge 2 | | | | |
| Acrylic Polymer | Example 1 | 12.68 | | |
| Acrylic Polymer | Example 2 | | 12.25 | |
| Paraloid B44S Acrylic Resin | Rohm-Haas | | | 10.43 |
| CYASTAT SN | Cytec | 0.04 | 0.04 | 0.03 |
| Isophorone | BP | 14.1 | 13.67 | 11.13 |
| Polyvinylidene fluoride | ATOFINA | 30.64 | 29.69 | 24.17 |

TABLE 3-continued

| Ingredient | Supplier | Example 3 | Example 4 | Example 5 |
|---|---|---|---|---|
| Bentone SD-1 clay | Elementis | 0.09 | 0.09 | 0.07 |
| MACN acrylic resin | PPG | 5 | 4.85 | 3.95 |
| 2-Ethyl hexyl acrylate homopolymer | PPG | 0.35 | 0.34 | 0.27 |
| Isopropyl alcohol | BP | 0.19 | 0.19 | 0.16 |
| Isophorone | BP |  | 3.17 | 20.23 |
| Total Weight |  | 100 | 100 | 100 |

The composition of MACN acrylic resin is described in Table 4.

TABLE 4

|  | Amount |
|---|---|
| Monomers |  |
| Ethyl Acrylate | 36.821 |
| Methacrylic acid | 2.676 |
| Methyl methacrylate | 21.179 |
| Methacrylonitrile | 17.31 |
| Solvents |  |
| N-butyl alcohol | 39.6 |
| 2-butoxyethanol | 21.26 |
| Acetone CP | 0.6 |
| Isopar K odorless Mineral Spirits | 0.6 |
| Xylene | 2.41 |
| Aromatic Solvent-150 type | 35.53 |
| percent Wt. Solids | 44.67 |

Charge 1 was added to a sand mill and milled until a Hegman grind reading of 7+ was reached. The milled pigment dispersion was then added to a Cowels mixer and mixed until a Hegman grind reading of 5.5 was achieved for the slurry. The total solids and viscosity using a No. 4 Zahn cup for each slurry was 60.8 percent (43.0 volume percent) and 44 seconds for Example 3, 58.9 percent (41.1 volume percent), 23 seconds for Example 4 and 48.0 percent (30.8 volume percent), and 43 seconds for Example 5. The data demonstrates the higher solids (lower VOC) property of the present fluoropolymer coating compositions when compared to a conventional fluoropolymer coating composition using an acrylic polymer that does not contain an aminoalkyl (meth)acrylate monomer.

The coating compositions of Examples 3–5 were applied, with a wet film wire-wound rod applicator to galvalume stainless steel. A primer, 1PMY5650 available commercially from PPG Industries, was applied with a dry film thickness of 0.2 mils. The coating compositions of Examples 3–5 were then applied with a peak metal temperature of 240° C. (465° F.) and a dwell time of 30 seconds. The topcoat dry film thickness was 0.8 mils for each example. Table 5 shows properties of the coated substrates.

TABLE 5

| Property | Example 3 | Example 4 | Example 5 |
|---|---|---|---|
| 60° Gloss | 35.5 | 45.8 | 44.4 |
| E.T. Pencil | 2H | H | 2H |
| Double Rub MEK | 100+ | 100+ | 100+ |
| Flexibility T-Bend - No Pick | 1T | 1T | 0T |
| Flexibility T-Bend - No Crack | 3T | 4T | 2T |

The data demonstrates that the high solids fluoropolymer coating compositions of the present invention have excellent solvent resistance, hardness, and flexibility properties.

The invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

We claim:

1. A method of coil coating to a metal substrate using a coil coating apparatus comprising:
    A) applying a coating composition such that the wet film thickness is 1 to 10 mils, wherein the coating composition comprises:
        (i) a continuous phase comprising:
            (a) 1 to 70 percent by weight based on total resin solids of a polymer comprising one or more (meth)acrylate monomers and one or more aminoalkyl(meth)acrylate monomers described by the structure:

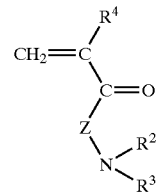

where Z is a divalent linking group; $R^2$ and $R^3$ are independently selected from H or $C_1$–$C_6$ linear or branched aliphatic; and $R^4$ is H or $CH_3$; and
            (b) 25–50 percent by weight of a solvent based on the total weight of the coating composition;
        (ii) 30 to 99 percent by weight based on total resin solids of a dispersed phase comprising solid dispersible particles of a fluorocarbon polymer; wherein the total resin solids are 50–75 percent by weight based on the total weight of the coating composition; and
    B) curing at a temperature of 200° C. to 300° C. for 10 to 50 seconds to form a cured dry film with a film thickness of 0.5 to 6 mils.

2. The method of claim 1, wherein Z is selected from —O—$R^1$— and —N($R^5$)—$R^1$—, wherein $R^5$ is H or $C_1$–$C_5$ linear or branched aliphatic, and $R^1$ is selected from the group consisting of or $C_1$–$C_{20}$ linear or branched aliphatic, aryl, alkylaryl, ethoxylated alkyl, ethoxylated aryl, ethoxylated alkylaryl, propoxylated alkyl, propoxylated aryl, and propoxylated alkylaryl.

3. The method of claim 1, wherein the polymer (a) is a thermoplastic resin.

4. The method of claim 1, wherein the polymer comprises 10 percent to 60 percent by weight of the resin solids portion of the coating composition.

5. The method claim 1, wherein the weight-average molecular weight of the polymer in (a) is from 7,000 to 20,000, as determined by gel permeation chromatography using polystyrene standards.

6. The method of claim 1, wherein the fluorocarbon polymer is one or more selected from the group consisting of poly(vinylidene fluoride), poly(vinyl fluoride), poly (chlorotrifluoroethylene), poly(tetrafluoroethylene), and poly(trifluoroethylene).

7. The method of claim 1, wherein the weight average molecular weight of the fluorocarbon polymer as determined by gel permeation chromatography using polystyrene standards is from 100,000 to 500,000.

8. The method of claim 1, wherein the particle size of the dispersible fluorocarbon polymer particles is 0.1 to 5.0 microns.

9. The method of claim 1, wherein the fluorocarbon polymer comprises 40 to 90 percent by weight of the resin solids portion of the coating composition.

10. The method of claim 1, wherein the solvent component is selected from the group consisting of aliphatic hydrocarbons, aromatic hydrocarbons, ketones, esters, glycols, ethers, ether-esters, glycol ethers, glycol ether-esters, alcohols, ether-alcohols, phthalate plasticizers and mixtures thereof.

11. The method of claim 1, wherein the (meth)acrylate monomers are one or more selected from the group consisting of methyl(meth)acrylate, n-butyl(meth)acrylate, t-butyl (meth)acrylate, and ethyl(meth)acrylate.

12. The method of claim 1, wherein the aminoalkyl(meth) acrylate monomer is an N-t-butyl aminoalkyl(meth)acrylate.

13. The method of claim 1, wherein the aminoalkyl(meth) acrylate monomer is t-butylaminoethyl methacrylate.

14. The method of claim 1, wherein the polymer in (i) comprises one or more additional monomers having the structure:

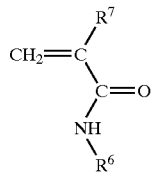

wherein $R^7$ is H or $CH_3$ and $R^6$ is —$CH_2$—OH or —$CH_2$—O—$R^{10}$ where $R^{10}$ is $C_1$–$C_6$ linear or branched aliphatic.

15. The method of claim 14 wherein the additional monomers include one or more selected from the group consisting of N-butoxymethylol acrylamide, N-butoxymethylol methacrylamide, N-methylol acrylamide and N-methylol acrylamide.

16. A substrate coated using the method of claim 1.

17. A method of spray coating a substrate using a spray coating apparatus comprising:
A) applying a coating composition such that the wet film thickness is 1 to 4 mils, wherein the coating composition comprises:
(i) a continuous phase comprising:
(a)) 1 to 70 percent by weight based on total resin solids of a polymer comprising one or more (meth)acrylate monomers and one or more aminoalkyl(meth)acrylate monomers described by the structure:

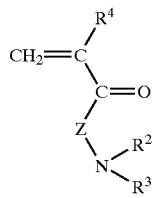

where Z is a divalent linking group; $R^2$ and $R^3$ are independently selected from H or $C_1$–$C_6$ linear or branched aliphatic; and $R^4$ is H or $CH_3$; and
(b) 25–50 percent by weight of a solvent based on the total weight of the coating composition; and
(ii) 30 to 99 percent by weight based on total resin solids of a dispersed phase comprising solid dispersible particles of a fluorocarbon polymer; wherein the total resin solids are 50–75 percent by weight based on the total weight of the coating composition; and
B) curing at a temperature of 200° C. to 300° C. for 5 to 20 minutes to form a cured dry film with a film thickness of 0.3 to 2 mils.

18. The method of claim 17, wherein Z is selected from —O—$R^1$— and —N($R^5$)—$R^1$—, wherein $R^5$ is H or $C_1$–$C_6$ linear or branched aliphatic, and $R^1$ is selected from the group consisting of or $C_1$–$C_{20}$ linear or branched aliphatic, aryl, alkylaryl, ethoxylated alkyl, ethoxylated aryl, ethoxylated alkylaryl, propoxylated alkyl, propoxylated aryl, and propoxylated alkylaryl.

19. The method of claim 17, wherein the polymer in (a) is a thermoplastic resin.

20. The method of claim 17, wherein the polymer in (a) comprises 10 percent to 60 percent by weight of the resin solids portion of the coating composition.

21. The method of claim 17, wherein the weight-average molecular weight of the polymer in (a) is from 7,000 to 20,000, as determined by gel permeation chromatography using polystyrene standards.

22. The method of claim 17, wherein the fluorocarbon polymer is one or more selected from the group consisting of poly(vinylidene fluoride), poly(vinyl fluoride), poly (chlorotrifluoroethylene), poly(tetrafluoroethylene), and poly(trifluoroethylene).

23. The method of claim 17, wherein the weight average molecular weight of the fluorocarbon polymer as determined by gel permeation chromatography using polystyrene standards is from 100,000 to 500,000.

24. The method claim 17, wherein the particle size of the dispersible fluorocarbon polymer particles is 0.1 to 5.0 microns.

25. The method of claim 17, wherein the fluorocarbon polymer comprises 40 to 90 percent by weight of the resin solids portion of the coating composition.

26. The method of claim 17, wherein the solvent component is selected from the group consisting of aliphatic hydrocarbons, aromatic hydrocarbons, ketones, esters, glycols, ethers, ether-esters, glycol ethers, glycol ether-esters, alcohols, ether-alcohols, phthalate plasticizers, and mixtures thereof.

27. The method of claim 17, wherein the (meth)acrylate monomers are one or more selected from the group consisting of methyl(meth)acrylate, n-butyl(meth)acrylate, t-butyl (meth)acrylate, and ethyl(meth)acrylate.

28. The method of claim 17, wherein the aminoalkyl (meth)acrylate monomer is an N-t-butyl aminoalkyl(meth) acrylate.

29. The method of claim 17, wherein the aminoalkyl (meth)acrylate monomer is t-butylaminoethyl methacrylate.

30. The method of claim 17, wherein the polymer in (a) comprises one or more additional monomers having the structure:

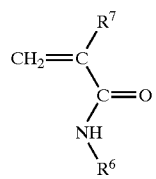

wherein $R^7$ is H or $CH_3$ and $R^6$ is —$CH_2$—OH or —$CH_2$—O—$R^{10}$ where $R^{10}$ is $C_1$–$C_6$ linear or branched aliphatic.

31. The method of claim 30 wherein the additional monomers include one or more selected from the group consisting of n-butoxymethylol acrylamide, n-butoxymethylol methacrylamide, N-methylol acrylamide, and N-methylol methacrylamide.

32. A substrate coated using the method of claim 17.

33. A method of extrusion coating a substrate using an extrusion coating apparatus comprising:
A) applying a coating composition such that the wet film thickness is 1 to 6 mils, wherein the coating composition comprises:
(i) a continuous phase comprising:
(a) 1 to 70 percent by weight based on total resin solids of a polymer comprising one or more (meth)acrylate monomers and one or more aminoalkyl(meth)acrylate monomers described by the structure:

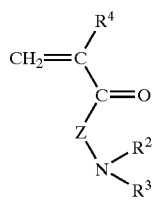

where Z is a divalent linking group; $R^2$ and $R^3$ are independently selected from H or $C_1$–$C_6$ linear or branched aliphatic; and $R^4$ is H or $CH_3$; and
(b) 25–50 percent by weight of a solvent based on the total weight of the coating composition; and
(ii) 30 to 99 percent by weight based on total resin solids of a dispersed phase comprising solid dispersible particles of a fluorocarbon polymer; wherein the total resin solids are 50–75 percent by weight based on the total weight of the coating composition; and
B) curing at a temperature of 200° C. to 500° C. for 10 seconds to 20 minutes to form a cured dry film with a film thickness of 0.3 to 4 mils.

34. The method of claim 33, wherein Z is selected from —O—$R^1$— and —N($R^5$)—$R^1$—, wherein $R^5$ is H or $C_1$–$C_6$ linear or branched aliphatic, and $R^1$ is selected from the group consisting of or $C_1$–$C_{20}$ linear or branched aliphatic, aryl, alkylaryl, ethoxylated alkyl, ethoxylated aryl, ethoxylated alkylaryl, propoxylated alkyl, propoxylated aryl, and propoxylated alkylaryl.

35. The method of claim 33, wherein the polymer (a) is a thermoplastic resin.

36. The method of claim 33, wherein the polymer in (a) comprises 10 percent to 60 percent by weight of the resin solids portion of the coating composition.

37. The method of claim 33, wherein the weight-average molecular weight of the thermoplastic resin is from 7,000 to 20,000, as determined by gel permeation chromatography using polystyrene standards.

38. The method of claim 33, wherein the fluorocarbon polymer is one or more selected from the group consisting of poly(vinylidene fluoride), poly(vinyl fluoride), poly(chlorotrifluoroethylene), poly(tetrafluoroethylene), and poly(trifluoroethylene).

39. The method of claim 33, wherein the weight average molecular weight of the fluorocarbon polymer as determined by gel permeation chromatography using polystyrene standards is from 100,000 to 500,000.

40. The method claim 33, wherein the particle size of the dispersible fluorocarbon polymer particles is 0.1 to 5.0 microns.

41. The method of claim 33, wherein the fluorocarbon polymer comprises 40 to 90 percent by weight of the resin solids portion of the coating composition.

42. The method of claim 33, wherein the solvent component is selected from the group consisting of aliphatic hydrocarbons, aromatic hydrocarbons, ketones, esters, glycols, ethers, ether-esters, glycol ethers, glycol ether-esters, alcohols, ether-alcohols, phthalate plasticizers, and mixtures thereof.

43. The method of claim 33, wherein the (meth)acrylate monomers are one or more selected from the group consisting of methyl(meth)acrylate, n-butyl(meth)acrylate, t-butyl (meth)acrylate, and ethyl(meth)acrylate.

44. The method of claim 33, wherein the aminoalkyl (meth)acrylate monomer is an N-t-butyl aminoalkyl(meth) acrylate.

45. The method of claim 33, wherein the aminoalkyl (meth)acrylate monomer is t-butylaminoethyl methacrylate.

46. The method of claim 33, wherein the polymer in (a) comprises one or more additional monomers having the structure:

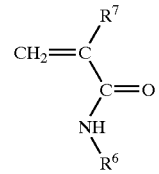

wherein $R^7$ is H or $CH_3$ and $R^6$ is —$CH_2$—OH or —$CH_2$—O—$R^{10}$ where $R^{10}$ is $C_1$–$C_6$ linear or branched aliphatic.

47. The method of claim 46 wherein the additional monomers include one or selected from the group consisting of n-butoxymethylol acrylamide, n-butoxymethylol methacrylamide, N-methylol acrylamide, and N-methylol methacrylamide.

48. A substrate coated using the method of claim 33.

* * * * *